Sept. 5, 1967    F. WENZEL ET AL    3,340,009

METHOD OF PRODUCING CRYSTALLINE BORON PHOSPHIDE

Filed March 20, 1963

3,340,009
METHOD OF PRODUCING CRYSTALLINE BORON PHOSPHIDE
Fritz Wenzel, Nurnberg, and Hans Merkel, Erlangen, Germany, assignors to Siemens-Schuckertwerke Aktiengesellschaft, Berlin-Siemensstadt and Erlangen, Germany, a corporation of Germany
Filed Mar. 20, 1963, Ser. No. 266,736
Claims priority, application Germany, Mar. 29, 1962, S 78,719
1 Claim. (Cl. 23—204)

Our invention relates to the production of boron phosphide and, in a preferred aspect, to the production of crystalline boron phosphide of the high purity required for electronic semiconductor purposes.

In principle, there are two ways of forming boron phosphide:
(1) Production from the component elements,
(2) Formation by conversion of boron and phosphorous compounds.

Based upon the first-mentioned principle is a method, known from U.S. Patent 3,021,196, according to which elemental, amorphous boron is reacted with gaseous phosphorus at a temperature of 1000° C., using $CoP_3$ as the source of phosphorus.

Another method for producing boron phosphides is performed at temperatures of about 1000° C. and employs elemental amorphous boron together with gaseous phosphorus directly produced from elemental phosphorus (Popper, P. Ingles, T. A., 1957, Boronphosphide, a III–V-Compound of Zinc/Blende Structure, Nature 179, 1075). Both methods furnish microcrystalline up to finecrystalline boron phosphide.

A method, based upon the second principle of converting boron compounds and phosphorus compounds, is described, for example, in French Patent No. 1,260,476:

B-metal alloy+P-metal alloy→BP

A material to be employed for semiconductor purposes is desired to fundamentally meet the following requirements:
(1) The material should preferably be available in form of monocrystals;
(2) The monocrystals should be of sufficiently large size;
(3) The monocrystals should have a sufficiently high degree of purity.

A major difficulty, in attempts to produce boron phosphide in sufficiently large monocrystals, is due to the extremely high melting point of boron phosphide, which melting point is expected to be above 3000° C. Therefore, the method of producing monocrystals from the melt, otherwise employed for $A^{III}B^V$ compounds, is not applicable for boron phosphide. It is therefore necessary to seek methods that afford growing boron phosphide monocrystals out of the vaporous phase.

It is an object of our invention to provide such a method of growing boron phosphide monocrystals by economically applicable means whereby larger monocrystals are obtained than heretofore. Another object of the invention is to produce boron phosphide crystals in a degree of purity considerably higher than that heretofore attained.

According to our invention, we place the boron-phosphide starting material without extraneous elemental substances, within a high-temperature zone maintained at least 530° C. of a reaction system, in contact with a phosphorus-vapor current. We then pass the gas into a zone of lower temperature and effect, in the latter zone, the precipitation of crystalline boron phosphide from the gas. Boron phosphide thus precipitates in polycrystalline and monocrystalline form.

The monocrystals, resulting from the method of the invention, are of a well defined elongated shape and of cubic crystalline structure. Their size exceeds the dimensions of the boron phosphide monocrystals produced in accordance with other, known methods.

A particular advantage of our method is that the purity of the polycrystalline, as well as of the monocrystalline, boron phosphide is very much greater than the purity of boron phosphide crystals heretofore producible by known methods.

Another advantage of the invention is that amorphous or crystalline boron phosphide of any available degree of purity can be employed as starting material.

A further advantage of the invention is based upon the fact that the physical-chemical phenomena upon which the method is predicated does not involve the participation of any elements other than boron and phosphorus. For that reason a contamination by foreign elements, as may readily occur when performing a conversion in media containing elements other than boron and phosphorus, is greatly eliminated.

The phosphorus used for the purpose of the invention is preferably of the highest available purity (99.999 or higher), if extremely pure boron phosphide is to be obtained. In conjunction therewith, an essential requirement of the invention is the employment of a phosphorus-vapor atmosphere for obtaining the conversion of the boron phosphide or its components into the gaseous phase and its subsequent reprecipitation in purified crystalline (mono- or polycrystalline) form. This method differs from an ordinary distillation or sublimation in that the conversion of the boron phosphide or its components into the gaseous phase is effected by a physical-chemical reaction between the boron phosphide used as starting material and the elemental phosphorus.

The high-temperature zone of the reaction system is preferably kept at a temperature between 1000° C. and 1600° C., and the low-temperature zone, in which the precipitation of the pure crystals takes place, is preferably kept at a temperature between 800 and 1500° C. The temperature difference between the high-temperature zone and the low-temperature zone should at least be 30° C. Temperature differences of 100 to 600° C., however, are preferably applied.

The method according to the invention can be performed in an open or in a closed (or sealed) reaction system. When an open system is employed, the phosphorus-vapor atmosphere can be moved over the boron-phosphide starting material by means of an inert carrier gas, e.g. helium. The flow velocity of the phosphorus-vapor atmosphere is preferably maintained from 0.5 to 1500 cc./min.

According to a modified feature of the invention, the method is performed with the aid of a unilaterally closed reaction system. The phosphorus vapor produced in the system is withdrawn at the open end of the system. This is done, for example, by using a pumping device for exhausting the phosphorus vapor. A continuous current of phosphorus vapor can also be maintained by condensing the phosphorus vapor in the cooling device at the outlet end of the reaction system. The phosphorus-vapor atmosphere is produced, for example by heating of elemental red or yellow phosphorus. The phosphorus-vapor pressure is kept at least at 0.01 atmosphere, but is preferably within the range of 0.5 to 10 atmospheres. The duration of the reaction is not critical; it may vary between one minute and several months.

The invention will be further described with reference to the accompanying drawing in which.

Figure 1:
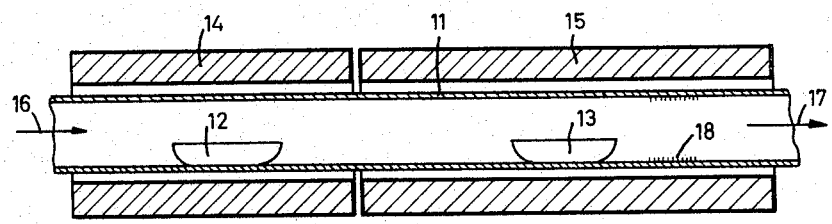
FIG. 1 shows in section a device for performing the method according to the invention with the aid of an open reaction system.

Referring to FIG. 1, the reaction system denoted by 11 consists of a tube open at both ends. Located in the tube are two boat-shaped containers 12 and 13. Container 12 serves for receiving the phosphorus, and container 13 for receiving the boron phosphoric starting material. The reaction tube 11 is located in the interior of two tubular heating furnaces 14 and 15. The inert carrier gas is introduced into the reaction system at 16 and leaves the system at 17. Schematically shown at 18 is the crystalline boron phosphide which precipitates in polycrystalline as well as in monocrystalline constitution.

The tubular reaction system 11 may consist of aluminum oxide and may be lined on its inner surface with a coating of boron phosphide. The tube 11 is heated by the two furnaces 14 and 15 so that three different temperature zones are formed along the reaction system. The first temperature zone serves for producing the phosphorus-vapor atmosphere from the elemental phosphorus located in container 12. The boron phosphide starting material in container 13 is located in the second temperature zone. The third temperature zone is that in which the purified boron phosphide is precipitated, in crystalline form, at 18. The precipitation zone can be designed as a removable portion, for example in form of inserted shells forming a longitudinally subdivided tube or insert which is placed into the reaction tube 11 and can be withdrawn therefrom.

Figure 2:
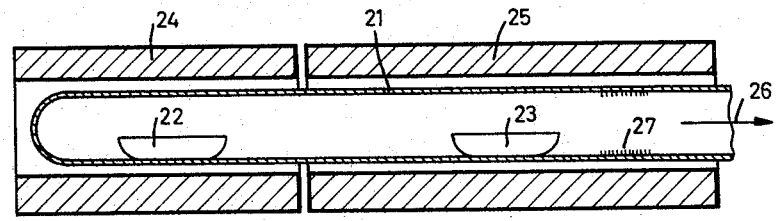
FIG. 2 shows in section another device for performing the method of the invention with the aid of a unilaterally closed reaction system.

According to FIG. 2, the reaction system 21 consists of a unilaterally closed tube in which are disposed two boat-shaped containers 22 and 23. Container 22 receives the phosphorus. Container 23 receives the boron phosphide starting material. The reaction tube 21 is located coaxially within two aligned tubular furnaces 24 and 25. The open end of the tube at 26 is connected to a pumping device or a cooling device (not illustrated) for maintaining a continuous current of phosphorus vapor in the direction of the arrow. The crystalline boron phosphide is schematically indicated at 27. The precipitate is polycrystalline as well as monocrystalline.

Figure 3:
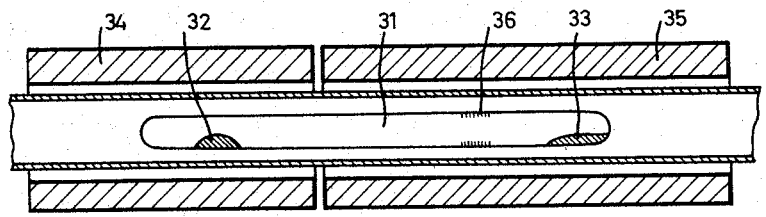
FIG. 3 shows a device for performing the method of the invention with the aid of a closed reaction system.

According to FIG. 3, the reaction system consists of a tube 31 closed at both ends. Located at 32 in the tube 31 is the phosphorus and at 33 an amount of boron. The closed reaction system is located within two tubular furnaces 34 and 35. Schematically shown at 36 is the resulting boron phosphide which precipitates in the form of monocrystals as well as in polycrystalline constitution.

By inserting baffle walls or partitions into the precipitation zone, the yield of monocrystals can be increased.

In order to improve the purifying effect of the method, it can be performed repeatedly. That is, the purified BP crystals obtained by the method can again be used as starting material in the same manner as described above in order to yield a second generation of crystals exhibiting increased purity.

If desired, a device may be inserted into the tubular reaction system to afford epitaxial precipitation of the boron phosphide upon another material of the same or similar crystalline lattice structure. In this manner, the resulting boron phosphide can be precipitated upon pre-inserted bodies of boron phosphide, for example.

The apparatus can be arranged horizontally, vertically, or in any other direction. The carrier gas as well as the phosphorus atmosphere employed can be recirculated for re-use in the process. The apparatus may also be so designed that it first produces boron phosphide in known manner from heated elemental boron by passing phosphorus vapor over the boron, and that during this process or after termination thereof, the crystal-producing process according to the invention proper is performed. In this case, the freshly formed boron phosphide is converted to the vaporous phase with the aid of the phosphorus-vapor atmosphere previously employed for the production of the boron phosphide, and the vapor is then caused to precipitate in the proper cooling zone of the apparatus to form crystals in accordance with the invention.

The crystalline boron phosphide obtained in accordance with the invention is monocrystalline to a large extent, the monocrystals having a longitudinal dimension up to some millimeters.

The method according to the invention permits admixing conventional doping substances, e.g. zinc or cadmium as acceptors and selenium or tellurium as donors to the phosphorus vapor or the boron-phosphide starting material in order to produce polycrystalline or monocrystalline boron phosphide of a predetermined conductance or type of conductance. By repetition of the method, therefore, boron phosphide monocrystals can be produced having a layer sequence of respectively different conductance type, for example n-p-n or p-n-p junction sequences. This is done by admixing different doping substances to the phosphorus vapor or the boron-phosphide starting material.

Example 1

A boat of aluminum oxide is filled with a specimen of polycrystalline boron phosphide and placed into an aluminum oxide tube open at both ends according to FIG. 1 Another boat of aluminum oxide is supplied with red phosphorus and disposed at the entrance of the tube (boat 12 in FIG. 1). The phosphorus is heated to 400° C. and the boron phosphide to 1500° C. A current of helium is supplied into the tube through its entrance (16 in FIG. 1) at a rate of 2.5 liters per hour. The helium passes first along the heated phosphorus and subsequently along the boron phosphide. The temperature at the zone following the boron phosphide is heated to 1265° C. Under the operating conditions mentioned, purified boron phosphide precipitates from the phosphorus-vapor atmosphere in monocrystalline form. The crystals are removed.

Example 2

A unilaterally closed quartz tube (21 in FIG. 2) is supplied at the closed end with 20 g. of red phosphorus. Disposed in an aluminum oxide boat are 4 g. of amorphous boron, this boat being placed into the middle portion of the tube. The air contained in the tube is displaced by means of argon. The tube is placed into two horizontally aligned furnaces so that the phosphorus is located in one furnace and the boron in the other furnace (substantially as exemplified by FIG. 2). The phosphorus is heated to 400° C., the boron to 1100° C., and the BP-separation zone to 910–980° C. The gaseous phosphorus is condensed in a cooling device at the outlet of the tube as a continuous phosphorus-vapor current passes through the tube. After proceeding in this manner for 300 hours the tube is permitted to cool. The boron has been found to be converted together with the gaseous phosphorus into micro-crystalline and fine-crystalline BP. In the BP-precipitation zone, spaced a few centimeters from the freshly formed fine-crystalline BP, monocrystals of BP are found to have grown from the gaseous phase on the tube wall.

Example 3

A unilaterally closed tube of aluminum oxide is used. 4 g. of amorphous boron is deposited in the vicinity of the closed end. Placed into the tube at the other end are 13 g. red phosphorus. Thereafter the tube is evacuated and sealed before being placed into two horizontally aligned electric resistance furnaces so that the boron is located in one furnace and the phosphorus in the other. The boron is heated to 1100° C., the phosphorus to 400° C., and the BP-precipitation zone to about 910–980° C. After 325 hours the tube is cooled and opened. The boron has reacted with the gaseous phosphorus and has formed micro-crystalline and fine-crystalline boron phosphide. A few centimers away from this freshly formed boron phosphide, namely in the BP-precipitation zone, a growth of boron phosphide monocrystals on the tube wall is found.

We claim:

The method of producing crystalline boron phosphide of high purity, which comprises contacting, in a reaction vessel, boron phosphide starting material in a high temperature zone between 1000° and 1600° C., with a phosphorus vapor current, then passing the vapors to a lower temperature zone to precipitate therein crystalline boron phosphide from the vapors.

References Cited

UNITED STATES PATENTS

| | | | |
|---|---|---|---|
| 2,921,905 | 1/1960 | Chang | 23—204 |
| 3,009,780 | 1/1961 | Stone | 23—204 |
| 3,224,911 | 12/1965 | Williams et al. | 23—204 |

OSCAR R. VERTIZ, *Primary Examiner.*

H. S. MILLER, *Assistant Examiner.*